Patented June 21, 1932

1,863,966

UNITED STATES PATENT OFFICE

ALEXANDER BROSCHE, OF GRUITEN, GERMANY, ASSIGNOR TO RHEINISCHE-WEST-FALISCHE KALKWERKE, OF DORNAP, GERMANY

PROCESS FOR EXTRACTING MAGNESIA FROM DOLOMITE

No Drawing. Application filed September 20, 1929, Serial No. 394,146, and in Germany September 26, 1928.

Processes have long been known for extracting magnesia from dolomite for the purpose of separating the two ingredients of the dolomite, lime and magnesia. Most of these processes are based on dissolving one of the ingredients.

Thus according to the Pattinson process a very pure magnesia is obtained by converting the magnesium oxide into soluble magnesium bicarbonate and separating this from the insoluble calcium carbonate by filtration. In other processes the different solubilities of the sulphate and saccharate serve for separation. Separation can also be effected by the addition of magnesium chloride solution to burnt dolomite, for a conversion according to the following equation takes place:—

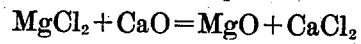

$$MgCl_2 + CaO = MgO + CaCl_2$$

The chalk converted into calcium chloride goes into solution while magnesium hydrate is precipitated from the magnesium chloride. Finally, it has also been proposed to recover the lime from strongly burnt dolomite or the magnesia from half burnt dolomite by washing out with water. All these processes required, however, large plants and have been abandoned for economic reasons.

In contradistinction to the above purely chemical processes it has been proposed to burn the dolomite at a temperature at which only the magnesium carbonate gives up its carbon dioxide. This half burnt product is ground and submitted to wind sifting. Such procedure is described in British Patent No. 1720/1881. In this case therefore the separation of the magnesium oxide from the calcium carbonate is effected by the aid of their differing specific gravities. Since the difference is not very great the separation can only be incomplete.

The present invention relates to a considerable improvement in this process. According to the invention the half burnt and ground dolomite before wind sifting is treated with sufficient water to convert the magnesium oxide into hydrate. At the same time carbon dioxide may be allowed to react upon it so that basic magnesium carbonate is formed. In this way the difference in the specific gravities of the parts to be separated is so great that complete separation is possible since the magnesium compounds obtained in this way have considerably smaller specific gravity than the calcium carbonate.

It should here be noted that the weight of one liter of ground limestone is 1.73 kg., and the weight of one liter of magnesium carbonate is 0.1 kg.

What I claim is:—

A method of extracting magnesium from dolomite which consists first, in burning the dolomite at a temperature at which only the magnesium carbonate is decomposed; second, grinding the resulting product; third; treating said product with sufficient water to hydrate the magnesium oxide; fourth, treating the mass with $CO_2$ in order to form magnesium carbonate; fifth, heating the mass until dry and to form a basic magnesium carbonate; sixth, wind sifting the resulting product in order to separate the basic magnesium carbonate from the heavier calcium carbonate, and lastly heating the basic magnesium carbonate to decompose the same to magnesium oxide, carbon dioxide and water vapor in order to recover the magnesium oxide.

In testimony whereof I affix my signature.

ALEXANDER BROSCHE.